A. F. RIETZEL.
CONSTRUCTION OF SHEET METAL UTENSILS.
APPLICATION FILED DEC. 26, 1906.
1,041,351.
Patented Oct. 15, 1912.
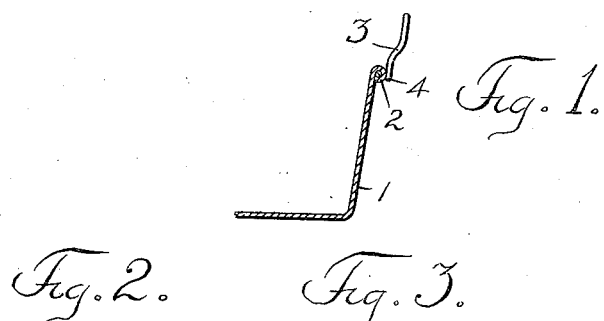
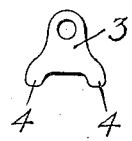
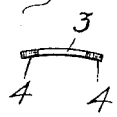
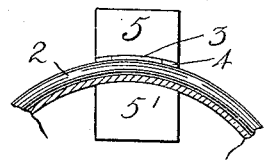
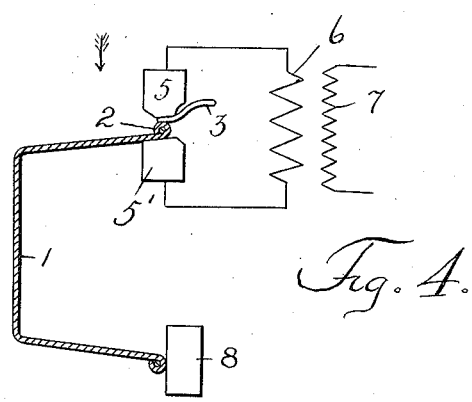
WITNESSES:
INVENTOR
Adolph F. Rietzel
BY
Townsend & Decker
ATTORNEYS.

UNITED STATES PATENT OFFICE.

ADOLPH F. RIETZEL, OF LYNN, MASSACHUSETTS, ASSIGNOR, BY MESNE ASSIGNMENTS, TO THOMSON ELECTRIC WELDING COMPANY, OF LYNN, MASSACHUSETTS, A CORPORATION OF MASSACHUSETTS.

CONSTRUCTION OF SHEET-METAL UTENSILS.

1,041,351.     Specification of Letters Patent.     Patented Oct. 15, 1912.

Application filed December 26, 1906. Serial No. 349,547.

*To all whom it may concern:*

Be it known that I, ADOLPH F. RIETZEL, a citizen of the United States, and a resident of Lynn, in the county of Essex and State of Massachusetts, with post-office address Lynn, Massachusetts, have invented certain new and useful Improvements in the Construction of Sheet-Metal Utensils, of which the following is a specification.

My invention relates to the manner of securing bail ears, handles or other attachments to the bodies of sheet metal utensils or similar articles. The usual method of securing such attachments is to rivet the ear, handle or other device to the plane surface of the utensil body which, in practice, is a more expensive method of attachment than that provided by my present invention and, moreover, does not form a perfect union such as is desirable when the utensil with its attachment is subsequently subjected to an enameling process. It has also been proposed to secure the attachment to the sheet metal body by indenting the sheet metal attachment or the surface of the body to which it is united to form electrical contacts of restricted area which will localize the heating electric current passed through the metal and bring the parts to the requisite welding temperature so as to permit the parts to be welded by pressure as in the well-known electric welding process. The latter method of attachment requires a special preparation of the parts to be united which it is one of the purposes of my invention to dispense union, while at the same time securing a firm union of the attachment to the utensil body.

Briefly stated, my invention consists in attaching the bail ear or other sheet metal attachment by welding it on its plane face directly to the rounded edge of the utensil body, said rounded edge affording on its point of contact with the plane face of the metal attachment, the contact of restricted extent which, by localizing the current and opposing its free passage, brings the parts quickly to the welding temperature preliminary to the application of the welding pressure. To assist in the localization of the heating effect, the ear or other attachment may be formed with two or more planar projections of restricted area which touch the rounded edge and form in a way heat localizing projections whose office is similar to that of the projections formed on the face of the attachment by indenting the metal as in the previous method of attachment. It is, however, within my invention to dispense with the use of such planar projections, the localization of the heating effect being then due simply to the fact that the plane face of the attachment makes contact with the edge on a rounded surface.

My invention consists further, broadly stated, of a sheet metal utensil having the bail ear or other attachment welded to the edge of the utensil body at a plane face of the attachment.

In the accompanying drawings, Figure 1 is a section through one side of the body of a sheet metal utensil showing the manner in which the bail ear or other attachment makes contact with the rounded edge. Fig. 2 is a plan of a bail ear of the preferred form. Fig. 3 is an end view of the attachment looking toward the end which has the planar projections. Fig. 4 shows the utensil and attachment as assembled between the pressure jaws or blocks of an electric welding apparatus by which the attachment may be welded to the edge of the utensil. Fig. 5 is a face view of the two welding jaws or blocks and illustrates the concave and convex form given to the surfaces in order that they may properly engage the circular edge of the utensil.

Referring to the drawings, 1 indicates the sheet metal body of a utensil having a rounded edge 2 usually employed for the purpose of reinforcing the metal at the edge. 3 is the attachment formed of sheet metal and shown in Fig. 2 as consisting of a bail ear, although as will be obvious, the attachment might be a sheet metal handle of any form or any other attachment which it is desired to secure to the utensil body.

In the preferred form of attachment, the same is provided with planar projections 4 which are adapted to restrict or lessen the area of contact between the attachment and the edge of the utensil. When so formed the union of the attachment and the rounded edge is by the plane faces of said planar projections 4, only, the intermediate portion being free of union with the edge. Ordinarily, it is preferred to use two or more planar projections as described, since the same being located at a considerable distance apart, form a more secure means of attachment. It would, however, be within my invention to make the union extend continuously across the face of the sheet metal attachment, the same being curved to properly engage the edge of the utensil in a continuous circumferential line. In any case, however, it will be seen that the plane face of the attachment forms a tangent to the curve of the edge of the utensil and thereby gives a restricted or limited area of contact for the passage of electric current used in the welding, thereby localizing the heating in order to quickly and economically heat the parts to a welding temperature at the point of union.

The actual operation of welding is conveniently carried on in an electric welding machine, parts of which are indicated in Fig. 3 diagrammatically. In this figure the contact and pressure jaws or blocks shown at 5, 5' are adapted to receive the edge of the utensil and the attachment 3 assembled as shown. The parts being lightly compressed together by the operation of the pressure jaws, electric current is permitted to flow and bring the parts to a proper welding temperature after which the quick application of heavy pressure completes the weld and forms a strong union between the attachment and the utensil body on the edge of the latter.

In Fig. 4 the usual transformed secondary of which the pressure blocks 5, 5' constitute the electrodes is typified at 6, while 7 typifies the transformer primary. 8 is a stop which assists in properly locating the utensil between the jaws 5, 5'. When the utensil body is round at its edge, the jaws 5, 5' should be properly formed as shown in Fig. 5, the one with a convex face to engage the inside of the utensil body and the other with a concave face to properly engage the curved edge of the attachment.

What I claim as my invention is:

1. A sheet metal utensil having its attached bail ear or other sheet metal attachment welded to a rounded edge of the utensil body by its plane face, as and for the purpose described.

2. A sheet metal utensil having a bail ear or other attachment welded to the edge of the utensil body by two or more projections in the same plane as the main body portion of the ear.

3. A sheet metal utensil having a rounded edge to which the bail ear or other attachment is welded at the plane face, of two or more planar projections extending from said attachment.

4. The combination with a sheet metal utensil, of a rounded reinforced edge on said utensil and a bail ear welded to said edge directly by the plane surface of said ear.

Signed at Lynn in the county of Essex and State of Mass. this 28th day of Nov. A. D. 1906.

ADOLPH F. RIETZEL.

Witnesses:
ADA J. NICHOLS,
ERNEST G. MITCHELL.

Copies of this patent may be obtained for five cents each, by addressing the "Commissioner of Patents, Washington, D. C."